Patented Apr. 9, 1929.

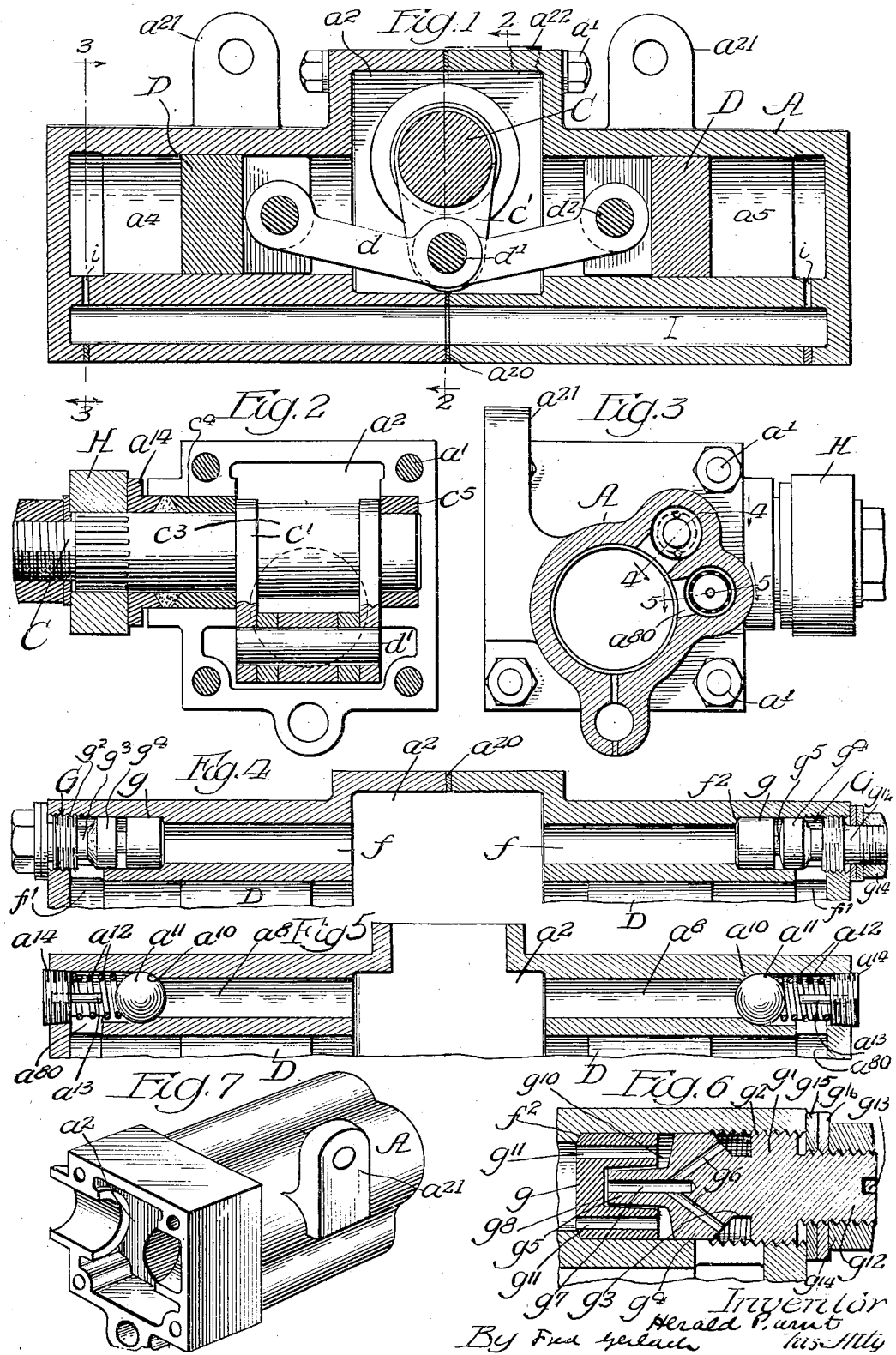

1,708,560

UNITED STATES PATENT OFFICE.

HERALD P. ARNT, OF JACKSON, MICHIGAN.

HYDRAULIC SHOCK ABSORBER.

Application filed January 26, 1927. Serial No. 163,642.

The invention relates to hyraulic shock absorbers.

One object of the invention is to provide an improved construction of shock absorber of this type which comprises a pair of oppositely arranged slidable pistons in a casing which is composed of sections and in which the outer ends of the cylinder are integrally formed with the casing sections to permit the absorbers to be readily assembled and produced at a low cost. Another object of the invention is to provide a shock absorber of the type which comprises a pair of oppositely arranged slidable pistons in which provision is made for forcing liquid from the cylinder in which it is under compression into the cylinder under suction to insure the filling at all times of the cylinders and thus prevent backlash which results from incomplete operation of the cylinders. Another object of the invention is to provide an improved shock absorber of this type, in which movable valves for controlling the restricted outflow of the liquid are dispensed with, by the use of devices which sufficiently restrict the flow and which can be readily adjusted and assembled in the casing. Other objects of the invention will appear from the detail description.

The invention consists in the several novel features hereinafter set forth and more particularly defined by claims at the conclusion hereof.

In the drawing: Fig. 1 is a vertical section of a device embodying the invention. Fig. 2 is a transverse section. Fig. 3 is a section taken on line 3—3 of Fig. 1. Fig. 4 is a section taken on line 4—4 of Fig. 3. Fig. 5 is a section taken on line 5—5 of Fig 3. Fig. 6 is an enlarged section of one of the flow restricting devices for the liquid forced from the cylinders under compression. Fig. 7 is a perspective of one of the casing-sections.

The invention is exemplified in a shock absorber comprising a casing A, the central portion of which is enlarged to form a chamber $a^2$ for the bifurcated crank $c'$ which has an integral hub $c^3$ which may be integrally formed with the transverse shaft C which is journalled in the casing. Cylinders $a^4$ and $a^5$ extend from the opposite ends of the chamber $a^2$ to the ends of the casing. These cylinders are aligned or coaxial and are oppositely disposed at the sides of the shaft C. Pistons D are slidably mounted in the cylinders respectively and each is operatively connected to the crank $c'$ by a pitman or link $d$ which has its inner end pivotally connected by a pin $d'$ to the crank and to one of the pistons by a pin $d^2$, so that rotative movement of the shaft C will impart simultaneous reciprocatory movement to the pistons in the same direction. The chamber $a^2$ and the cylinders are filled with a suitable liquid, such as oil. The casing is composed of sections having their edges meeting in a vertical plane which extends substantially through the axis of the shaft C, so that one cylinder and one-half of the chamber $a^2$ will be formed in each of the casing-sections. The sections are secured together by bolts $a'$ and, if desired, a packing gasket $a^{20}$ may be placed between the contiguous faces of the sections. The purpose in thus forming the casing and sections is to make it possible to place the pistons, shaft C, and crank $c'$ in the casing, and to use cylinders, the outer ends of which are closed by walls integral with the casing sections respectively. This makes it possible to dispense with removable heads for the outer ends of the cylinders. The inner end of the shaft C is journalled in a bushing $c^4$ which is held in a flange integrally formed with the back-wall of the casing. The outer end of the shaft is journalled in a sleeve $c^5$ which is secured in the casing. In assembling the device, the pistons and crank-shaft and pitmen are first connected together; the sections of the casing are then placed around the shaft and secured together. After the sections have been secured together, the sleeve $c^5$ is pressed into position between the sections. A packing box $a^{14}$ is provided for the outer end of the shaft to prevent leakage of fluid from the casing and around the shaft. The casing sections are provided with lugs $a^{21}$ whereby it may be bolted to the frame of the vehicle. An arm H is connected to the outer end of the shaft C and the distal end of this arm is connected in any suitable manner to the axle or some part secured thereto, so that relative movement between the axle and the chassis will oscillate the arm H to rock the shaft C so as to simultaneously move one of the pistons inwardly and the other outwardly.

Liquid is drawn into the outer ends of the cylinders by the suction strokes of the pistons respectively and is compressed in the outer ends of the cylinders during the out-strokes of the pistons. Inlet ducts $a^8$ lead from the chamber $a^2$ longitudinally to the outer ends of the casing and communicate with the outer ends of the cylinders respectively by ports $a^{80}$. Each duct $a^8$ is controlled by a ball check-valve $a^{11}$ which is normally held against a seat $a^{10}$ by a coil spring $a^{12}$. The outer end of each duct $a^8$ is closed by a screw-plug $a^{14}$ which is provided with a stem $a^{13}$ adapted to limit the movement of the valve $a^{11}$ away from its seat. During the suction strokes of the pistons, the valves $a^{11}$ will be opened and permit the fluid to be drawn into the outer ends of the cylinder as soon as the suction is sufficient to open the valves.

The fluid compressed by the pistons in the lower ends of the cylinders respectively, passes back to the chamber $a^2$ through horizontal ducts $f$ which open at their inner ends into the chamber $a^2$ and are connected at their outer ends by ducts $f'$ to the cylinders respectively. To restrict the escape of the liquid under compression in the cylinders, an adjustable device G, separately formed from the casing, is provided adjacent the outer end of each duct $f$. Each of said restricting devices comprises a member or plug $g$ which is pressed or otherwise suitably secured in the duct $f$ and against a shoulder $f^2$, and an adjustable member $g'$. The latter member is provided with a screw-threaded portion $g^2$ which is threaded into the outer end of its duct $f$ which extends through the outer end of the casing; a reduced portion or neck $g^3$, a portion $g^4$ which fits snugly in the duct $f$; and a nipple or nozzle $g^5$ at its inner end. Oblique ports $g^6$ lead from the outer side of portion $g^4$ and merge into a common central duct $g^7$ which extends to the inner end of the nozzle $g^5$. Member $g$ is formed with a socket $g^8$ into which the nozzle $g^5$ extends. The socket is of sufficient diameter and its top is spaced slightly from the end of the nozzle $g^5$ to permit the liquid to flow laterally between the top of the nozzle and the inner end of the socket and thence outwardly or in reverse direction, to the space $g^{10}$ between the outer end of member $g$ and the inner surface of enlarged portion $g^4$ of member $g'$. The socket is preferably flared outwardly, so that by adjustment of the nozzle, the area of the space around it for the escape of liquid may be increased or decreased. Ports $g^{11}$ extend longitudinally through the member $g$ outwardly of the socket $g^8$ so that the liquid from space $g^{10}$ may pass inwardly into the duct $f$. The screw-connection between portion $g^2$ of member $g'$ and the casing permits the nozzle of member $g'$ to be adjusted to vary the flow through the member $g$, so that the action of the absorber may be regulated to suit different vehicles or vehicles carrying different loads. A screw-threaded stem $g^{12}$ projects from the outer end of member $g$ and is provided with a kerf $g^{13}$, so that it may be rotated. A nut $g^{14}$ is adapted to clamp a packing $g^{15}$ and washer $g^{16}$ against the lower end of the casing to prevent leakage of liquid from the port $f$.

A port I is formed in the casing and extends from one end to the other. The ends of this port are connected to the cylinders respectively by a small duct $i$. These form a by-pass to permit a small or restricted flow of liquid from the cylinder under compression to flow to the cylinder under suction at all times for the purpose of insuring the filling of the cylinders and preventing the backlash which results from incompletely filled cylinders.

The operation will be as follows: When the vehicle is subjected to a shock which will cause the chassis to move toward the axle, arm H will rock shaft C and the crank $c'$ so that the pistons will simultaneously move inwardly and outwardly respectively as the result of said relative movement.

During the down-stroke of the vehicle, fluid will be drawn by the inwardly moving piston through one of the ducts $a^8$ into and past one of the check-valves $a^{11}$ and simultaneously the other piston will move outwardly to compress the liquid in its cylinder. At all times, liquid from the cylinder, in small quantity, will be forced through the by-pass I and duct $i$ to insure the filling of the cylinder under suction. During the compression strokes of the pistons, the liquid will be forced from its cylinder through one of the restricted flow devices G into the chamber $a^2$. In the device G the noise, resulting from forcing the liquid under high compression through the discharge port, will be muffled and the flow will be restricted to retard the movement of the chassis to the desired degree. By adjusting the member $g'$, the degree of retardation and the outflow of the liquid may be regulated to result in the desired retardation of the chassis for different loads or vehicles.

The invention exemplifies a shock absorber of the opposed cylinder type, in which the casing is formed of sections joined in the plane of the axis of the transverse shaft to permit the pistons and crank and pitmen to be conveniently inserted in the casing, and to make it possible to use cylinders having their ends closed by walls integral with the casing sections. The invention also exemplifies a shock absorber of this type in which the use of a discharge valve, which opens and closes responsively to suction and pressure, is dispensed with; also one in which provision is made for by-passing a limited quantity of the liquid from the compression cylinder to the suction cylinder to insure the filling of the cylinder at all times and thus prevent backlash which results from incompletely filled cylinders.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a shock absorber, the combination of a casing containing a liquid and provided with a pair of oppositely arranged cylinders with a chamber between them, pistons slidably mounted in the cylinders, a transverse operating shaft mounted in the casing and extending across said chamber and connected to operate the pistons, longitudinal outlet ducts extending from the chamber through the outer ends of the casing for the cylinders respectively, valved inlet ducts, and devices for restricting the outflow of the liquid from the cylinders in the outer ends of said ducts, each comprising a pair of members one of which has a nozzle and the other a socket around the nozzle.

2. In a shock absorber, the combination of a casing containing a liquid and provided with a pair of oppositely arranged cylinders with a chamber between them, pistons slidably mounted in the cylinders, a transverse operating shaft mounted in the casing and extending across said chamber and connected to operate the pistons, longitudinal outlet ducts extending from the chamber through the outer ends of the casing, for the cylinders respectively, valved inlet ducts, and devices for restricting the outflow of the liquid from the cylinders in the outer ends of said ducts, each comprising a pair of members one of which has a nozzle and the other a socket around the nozzle, one of said members being adjustable relatively to the other to regulate the discharge of fluid.

3. In a shock absorber, the combination of a casing containing a liquid and provided with a pair of oppositely arranged cylinders with a chamber between them, pistons slidably mounted in the cylinders, a transverse operating shaft mounted in the casing and extending across said chamber and connected to operate the pistons, longitudinal outlet ducts extending from the chamber through the outer ends of the casing, for the cylinders respectively, valved inlet ducts, and devices for restricting the outflow of the liquid from the cylinders in the outer ends of said ducts, each comprising a pair of members one of which has a nozzle and the other a socket around the nozzle, one of said members being adjustable relatively to the other to regulate the discharge of fluid from the outside of the casing.

4. In a shock absorber, the combination of a casing containing a liquid and provided with a pair of oppositely arranged cylinders with a chamber between them, pistons slidably mounted in the cylinders, a transverse operating shaft mounted in the casing and connected to operate the pistons, inlet and outlet ducts between the outer ends of the cylinders and the chamber, means in the outlet ducts to restrict the discharge of liquid from the cylinder, and a by-pass between the outer ends of the cylinders for permitting a restricted quantity of the liquid under compression to be forced into the cylinder under suction.

5. In a shock absorber, the combination of a casing containing a liquid and provided with a pair of oppositely arranged cylinders with a chamber between them, pistons slidably mounted in the cylinders, a transverse operating shaft mounted in the casing and connected to operate the pistons, inlet and outlet ducts between the outer ends of the cylinders respectively and the chamber, valves in the inlet ducts, restricted flow devices in the outlet ducts, and a longitudinal by-pass between the outer ends of the cylinders for permitting a restricted quantity of the liquid under compression to be forced into the cylinder under suction, the outer ends of the by-pass being closed by walls integral with the casing.

6. In a shock absorber, the combination of a casing containing a liquid and provided with a pair of oppositely arranged cylinders with a chamber between them, pistons slidably mounted in the cylinders, a transverse operating shaft mounted in the casing, extending across said chamber and connected to operate the pistons, the casing being composed of sections meeting substantially in the plane of the axis of the shaft and having integral walls forming the outer ends of the cylinders, a by-pass between the outer ends of the cylinders for permitting a restricted quantity of the liquid to be forced from each cylinder into the other, the by-pass being closed at its outer ends by walls integral with the sections respectively, and inlet and restricted outlet ducts between the outer ends of the cylinders and said chamber respectively.

Signed at Jackson, Michigan, this 19th day of January, 1927.

HERALD P. ARNT.